United States Patent [19]

Itoh et al.

[11] 4,342,665

[45] Aug. 3, 1982

[54] AQUEOUS GEL COMPOSITIONS

[75] Inventors: Hiroyuki Itoh; Hirosuke Imai, both of Yokohama, Japan

[73] Assignee: Nippon Oil Company, Ltd., Tokyo, Japan

[21] Appl. No.: 872,431

[22] Filed: Jan. 26, 1978

[30] Foreign Application Priority Data

Jan. 26, 1977 [JP] Japan .................................... 52-6761

[51] Int. Cl.$^3$ ............................................. B01J 13/00
[52] U.S. Cl. ........................................ 252/316; 252/3; 252/8.05; 252/607; 252/610
[58] Field of Search ................ 252/316, 8.05, DIG. 2, 252/3, 607, 610; 526/335

[56] References Cited

U.S. PATENT DOCUMENTS

| | | | |
|---|---|---|---|
| 3,334,052 | 8/1967 | Kurz et al. ........................... | 252/316 |
| 3,407,164 | 10/1968 | Schmidt ........................... | 526/335 X |
| 3,562,176 | 2/1971 | Stancioff et al. .................... | 252/316 |
| 3,856,088 | 12/1974 | Frisque ........................... | 252/316 X |

FOREIGN PATENT DOCUMENTS 1223701  8/1966  Fed. Rep. of Germany ..... 252/8.05

*Primary Examiner*—Richard D. Lovering
*Attorney, Agent, or Firm*—Scully, Scott, Murphy and Presser

[57] ABSTRACT

This invention provides novel aqueous gel compositions comprising as the essential components one or more surface active agents selected from the group consisting of anionic and nonionic surface active agents, a water-soluble salt of a conjugated diene-maleic acid derivative copolymer, calcium ion and water, and as needed, containing a chelating agent.

2 Claims, No Drawings

AQUEOUS GEL COMPOSITIONS

BACKGROUND OF THE INVENTION

1. Field of the Invention

This invention relates to novel compositions capable of readily forming aqueous gel.

2. Description of the Prior Art

The aqueous gel is widely used as extinguishant, soil stabilizers, thickeners, adhesion modifiers, dyeing auxiliaries or the like. There are two classes of the aqueous gel, one with a very high viscosity still a fluidity and the other being solid or semi-solid without fluidity. In a broad sense, both are called aqueous gels. Illustrative of the former are aqueous solutions of a water-soluble macromolecular substance such as sodium alginate, carboxymethylcellulose sodium salt and polyacrylic acid sodium salt. These are utilized as a glueing agent, thickener or the like. In order to obtain an aqueous gel of high viscosity, however, concentration of the macromolecular substance dissolved should be high. As their solutions are high in viscosity upon preparation, they are not suitable for uses where a viscosity as low as possible prior to use is preferable. There has been found processes with sodium polyacrylate in which the solution is low in viscosity prior to use but yields an aqueous gel when used by, for example, mixing an aqueous solution of polyacrylic acid with an aqueous solution of an alkali such as sodium hydroxide just prior to use. The process, however, causes another trouble in that the aqueous solution is alkaline. On the other hand, an example of the latter is an aqueous solution of polyvinyl alcohol and boric acid. As the active components are two in this case, aqueous solutions respectively containing the two component can be mixed just prior to use to prepare an aqueous gel. It is possible by the process to eliminate the aforementioned problems if needed. However, the polyvinyl alcohol-boric acid system has not yet found wide use, because mixing of aqueous solutions at relatively high concentrations is required in order to produce an effective aqueous gel.

SUMMARY OF THE INVENTION

The present invention provides novel aqueous gel compositions which eliminate the disadvantage mentioned above. The present invention relates to novel compositions capable of forming aqueous gel compositions with low concentrations of effective components, capable of being handled with safety, capable of being handled in a low concentration state, capable of forming aqueous gels rapidly by mixing all of effective components immediately before use, capable of forming various aqueous gels ranging one with fluidity and one without fluidity like jelly by means of varying proportions of the components, and capable of being applied for various uses.

DESCRIPTION OF THE INVENTION

The composition according to the present invention involves compositions readily capable of forming aqueous gel which comprises one or more surface active agents selected from the group consisting of anionic and nonionic surface active agents, a water-soluble salt of a conjugated diene-maleic acid derivative copolymer, calcium ion and water. Each component of the compositions according to the invention will be described in more details below.

As the surface active agent that may be employed in the compositions of the invention are mentioned anionic surface active agents such as sodium, amine and ammonium salts of a higher fatty alcohol sulfate containing from 6 to 30 carbon atoms, sodium, potassium, amine and ammonium salts of an alkylaryl sulfonic acid in which the alkyl group contains from 6 to 30 carbon atoms, sodium, potassium, amine and ammonium salt of a polyoxyethylene alkyl ether sulfate, sodium, potassium, amine and ammonium salts of a polyoxyethylene alkylphenol ether sulfate, and sodium and potassium salts of a fatty acid containing from 6 to 30 carbon atoms. Also included are nonionic surface active agents such as a polyoxyethylene alkyl ether, polyoxyethylene ester of fatty acid and polyoxyethylene alkylphenol ether containing from 6 to 30 carbon atoms. Two or more of them may of course be used. Preferred among them are sodium, amine or ammonium salt of lauryl alcohol sulfate, sodium salt of a mixed alcohol sulfate containing from 8 to 16 carbon atoms, sodium dodecylbenzenesulfonate, triethanolamine salt of polyoxyethylene lauryl ether sulfate, polyoxyethylene nonylphenol ether, polyoxyethylene lauryl ether, polyoxyethylene stearyl ether and the like.

As the macromolecular component in the composition of the invention which is a water-soluble salt of a conjugated diene-maleic acid derivative copolymer are preferably employed water-soluble salts of a copolymer from a conjugated diene usually containing from 4 to 12 carbon atoms such as, for example, butadiene, isoprene, piperylene, 2,3-dimethylbutadiene, 2-methyl-1,3-hexadiene, 2,4-hexadiene, 1-methoxybutadiene, chloroprene, 2,3-dichlorobutadiene or cyclopentadiene or a mixture of two or more of them and one or more maleic acid derivatives selected from the group consisting of maleic acid and derivatives thereof such as, for example, maleic anhydride, monoalkyl maleates, methylmaleic acid, methylmaleic anhydride, chloromaleic acid and chloromaleic anhydride. Molecular weight of these water-soluble salts has a great influence upon the properties of aqueous gel prepared from the compositions of the invention. The molecular weight of a water-soluble salt preferred as a component of the composition is preferably from 0.01 to 3.0 in terms of the intrinsic viscosity measured at 30° C. and more preferably from 0.02 to 2.0. Conjugated diene-maleic acid derivative copolymers with an intrinsic viscosity smaller than 0.01 or larger than 3.0 are substantially difficult to produce. Especially, water-soluble salts from those with an intrinsic viscosity larger than 3.0 are troublesome in handling due, for example, to the slow rate of dissolution in water. This component which is the macromolecular component of the composition gives the aqueous gel respectively peculiar properties depending upon the molecular weight. There is a general tendency that water-soluble salts of a lower molecular copolymer afford a gel fast in the rate of gelation but relatively low in the strength, whereas water-soluble salts of a higher molecular copolymer yield a gel high in the strength, although the tendency cannot be generalized because, for example, of its dependency upon the amount employed.

Synthesis of the conjugated diene-maleic acid derivative copolymer used as the starting material for the water-soluble salt can be effected by known methods. Most easily done is the radical polymerization using a variety of radical initiaters. Copolymers produced by polymerization with ionizable radiation or using as the catalyst an organometallic compound may also be employed. Molecular weight of the copolymer can also be adjusted by known methods. When synthesis of lower molecular copolymers is particularly intended, it is achieved by addition to the polymerization system of a chain transfer agent such as mercaptans and disulfides.

Water soluble salts can be synthesized from the conjugated diene-maleic acid derivative copolymers thus obtained also by known methods. For example, the water-soluble salts are prepared by dissolving the copolymer in an aqueous solution of an alkali metal hydroxide such as sodium, potassium or lithium hydroxide, an alkali metal carbonate such as sodium, potassium or lithium carbonate, an alkali metal hydrogen carbonate such as sodium or potassium hydrogen carbonate, ammonia or an organic amine. Proportion of carboxylic or maleic radical converted to the salt in the copolymer is not particularly limited so long as the copolymer is water-soluble.

The cation portion of the salt thus obtained is a member selected from the group consisting of sodium, potassium, lithium, magnesium, ammonium and amine, and the anion portion of said salt is carboxylate anion of the polymer mentioned above.

As many of the maleic acid derivative copolymers are water soluble as they are without being converted to the salt, it is possible for a copolymer in acid form to be used as it is as a component of the solution. Nevertheless, they are not suitable for practical use in consideration of such factors as solubility and easiness in handling. Addition of a water-soluble magnesium compound to an aqueous solution of a salt of these copolymers at a pH from 7 to 14 yields a water-soluble magnesium complex salt of the copolymer. We have found that aqueous solutions of the magnesium complex salt exert such a novel character that they are liquid in lower temperatures but solid in higher temperatures and the change is reversible and filed a few patent applications (Japanese Patent Public Disclosure No. 47994/1976, Patent Application No. 89184/1975, Patent Application No. 111775/1975). The magnesium complex salts of conjugated diene-maleic acid derivative copolymers can of course be an effective component of the compositions of the invention. As the water-soluble salts of conjugated diene-maleic acid derivative copolymers used as a component of the compositions of the invention are particularly preferred, for example, sodium, potassium, ammonium and magnesium salts of butadiene-maleic acid copolymer, isoprene-maleic acid copolymer, piperylene-maleic acid copolymer, butadiene monomethylmaleate copolymer and isoprene-chloromaleic acid copolymer.

An aqueous solution comprising a water-soluble salt of these macromolecules, a surface active agent, calcium ion and water is the novel composition of the present invention capable of readily forming aqueous gel. As the source for calcium ion is used any compound capable of liberating calcium ion in water. Natural water containing calcium ion such as sea water or hard water may be employed for providing both calcium ion and water which are the essential components of the invention. It is one of the characteristic features of the invention that such inexpense, highly safe and naturally available calcium can be used.

The rate of gelation, fluidity of the resulting aqueous gel and the mechanical strength of the compositions of the invention are variable depending upon variation in proportions of the components. Therefore, it is feasible to adjust properties of the aqueous gel in such a way that they meet requirements for use. The compositions of the invention are also characterized by the feasibility. Appropriate proportion of the water-soluble salt of conjugated diene-maleic acid derivative copolymer used in the composition is from 0.1 to 10% by weight. A proportion from 0.2 to 8% by weight is preferable. (All percentages used herein below are by weight.) With a proportion less than 0.1% it is difficult to obtain an effective gel and a proportion more than 10% is not advisable because this will be beyond the purpose of aqueous gel which represents thickening or gelation of water by the action of effective components at lower concentrations.

The surface active agent is used in the composition suitably in a proportion from 0.1 to 10% and preferably from 0.2 to 8%. Proportions less than 0.1% and more than 10% are not advisable by the same reason as with the water-soluble copolymer salts. The water-soluble macromolecular salt to surface active agent ratio ranges suitably from 1:10 to 10:1 by weight and preferably from 1:5 to 5:1. Since the composition produces aqueous gel by the interaction between the two and calcium ion, too much different ratios between the two will not produce the expected result, and in this respect, a range from 1:10 to 10:1 is preferable. The proportion of calcium ion in the composition is preferably from 0.01 to 1.0% and more preferably from 0.02 to 0.5%. If the quantity of calcium ion contained in the composition is less than 0.01%, there will not be produced thickening or non-fluid aqueous gel. On the other hand, if it is more than 1.0%, adverse reactions such as salting out other components will take place due to a too high ion concentration.

The rate of gelation of the aqueous gel composition partly depends upon the concentration of calcium ion so that a predetermined rate of gelation can be achieved by properly choosing the quantity of calcium ion. In general, larger amount of calcium ion will induce faster rate of gelation at a given level of other components employed. When it is necessary to keep a lower viscosity prior to use or in storage and form the state of aqueous gel on use, the object is achieved by separately preparing and storing an aqueous solution containing one component other than water and an aqueous solution containing the other components. One of the methods involves mixing an aqueous solution containing calcium ion with an aqueous solution containing a copolymer salt and a surface active agent, which is suitable for use of sea water or the like as the water source. An aqueous solution of a calcium source such as calcium chloride at a predetermined concentration may also be employed in place of the sea water; calcium ion in an amount sufficient to induce rapid gelation after mixing is used. Another method is to mix an aqueous solution containing calcium ion and a surface active agent with an aqueous solution containing a copolymer salt. The method is characterized by formation of a strong aqueous gel in a very short period of time after mixing. Selection of one or the other method or another one to be used should be made depending upon the purpose. On the other hand, there is a method which enables one to omit trouble of separately keeping the two solutions as well as to provide a period of time for use at a low viscosity level necessary for smooth handling by using a chelating agent typically including ethylenediaminetetracetate sodium salt (EDTA), tetrahydrophthalic acid and tetrahydrophthalic acid monosodium salt (THPA). Particularly preferable for use are chelating agents forming a chelate with calcium but no precipitates. As the amount of calcium ion is somewhat correlated with strength of the resulting aqueous gel, use of a minimum amount of calcium is required for some uses. In such cases, addition of EDTA, THPA or the like is very effective for assuring a desired gel strength and simultaneously providing a predetermined period of time for use. It is feasible by this method to produce a final aqueous gel with a desired strength after maintaining a lower viscosity level for a period from 30 min. to 3 hrs. The amount of EDTA, THPA or the like to be added is not particularly limited. It is usually from 0.1 to 10% by weight. Wider application of the composition by the use of a chelating agent typically including EDTA and THPA is one of the characteristic features of the present invention, although the chelating agent is not an essential component of the compositions according to the invention. Another useful effect is exerted by the addition of THPA. Whereas among the THPA is, for example, monosodium cis-$\Delta^4$-tetrahydrophthalate which is a Diels-Alder reaction product between butadiene and maleic anhydride, monosodium salt of a Diels-Alder adduct obtained from isoprene and maleic anhydride or from chloroprene and maleic anhydride may be used in the same way. Mixtures of a hydrolyzate of these Diels-Alder adducts which is an acid and the salt may also be employed. Aqueous gel obtained from a composition of the invention containing one of these compound such as THPA is generally characterized by high transparency and elasticity. Another factor affecting the gelation rate of aqueous gel is the molecular weight of the copolymer used as the starting material for the water-soluble salt. In general, use of a water-soluble salt prepared from a lower molecular copolymer affords a higher rate of gelation, and the effect is particularly remarkable with the salts of lower molecular copolymers prepared with alkylmercaptans added in synthesizing the starting copolymer.

Strength of the aqueous gel provided from the composition is variable depending upon the molecular weight of water-soluble salt of the conjugated diene-maleic derivative copolymer employed and also affected by the amount of calcium ion and surface active agents. Strength of the aqueous gel is higher with a copolymer of a larger intrinsic viscosity used as the starting material for the salt at a given level of the salt used. It is generally desirable to employ a copolymer with an intrinsic viscosity of 0.2 or higher. On ther other hand, amounts of the surface active agent and calcium ion also have an effect upon the strength of aqueous gel. Larger amounts of the two components and the copolymer salt used in relation to the amount of water will increase strength of the resulting aqueous gel. Fluidity of the aqueous gel is closely related to its strength; of course, strong aqueous gel has no fluidity at all. Jelly-like aqueous gel which has neither high strength nor fluidity may also be obtained by appropriately selecting the conditions for the composition. When thickened water with fluidity is required, amounts of the components other than water, especially the amount of calcium ion used may be decreased.

The aqueous gel compositions being provided with many advantages as described above are useful in a variety of uses. First of all, use of the compositions is suitable for the field of extinguishant. The primary fire fighting agent is water. Water is most important in fighting a fire in most cases, especially in the case of a great fire, although a powder extinguishant or an inert gas extinguishant is effective in the use fitted for its capacity. However, a greater portion of the water dashed in the object on fire or the inflammables in its neighborhood is flown out so that the quantity of water utilizable for effectively fighting the fire or checking the spread of the fire will be far smaller. A variety of so-called aqueous gel extinguishants have been devised in which water is thickened or non-fluidized to increase the quantity of residual water on the object thereby increasing efficacy of water used for the proper purpose. The aqueous gel obtained from the compositions of the invention is suitable for use in the aqueous gel extinguishant. Effective fire fighting can be performed with gelled water promptly formed after discharge by mixing prior to the discharge an aqueous solution containing one or two components other than water and an aqueous solution containing one or two remaining components other than water. The compositions are particularly valuable for use as the extinguishant in that they do not contain components harmful to the human body and are safe during and after the fire-fighting operation.

Another application of the aqueous gel from the compositions in the field of extinguishant is one to the extinguishant for forest fire. Many countries in the world including Japan suffer big loses from forest fire every year, with much efforts devoted to the countermeasures. Because of a limited quantity of water available against the forest fire a small quantity of water should effectively be worked. To answer the purpose a particular aqueous gel extinguishant has been used, which is water thickened with an agent such as carboxymethyl-cellulose sodium salt (CMC) and with a variety of salts added. Thickened aqueous gels from the compositions are suitable for use as the forest fire extinguishant by selecting appropriate conditions. Use of the aqueous gel from the compositions is characterized by smaller contents of the effective components necessary for exerting a water-thickening effect as compared with the case with CMC or the like. It is also characterized by water retention resulted from proceeding of the gelation after attached to trees, etc. while being sprinkled in the state of a proper viscosity by controlling the rate of gelation by the addition of EDTA or the like. Furthermore, heat from the fire accelerates the gelation to form non-fluid aqueous gel to exert fire-preventing and -fighting effects. It is known that addition to the forest fire extinguishant of salts such as ammonium sulfate, sodium carbonate and ammonium phosphate. These salts may be added to the compositions, which do not interfere with the results of the present invention but increase the fire-fighting performance.

One illustrative application of the compositions of the invention to the field of extinguishant is one to the air foaming extinguishant which is a foaming extinguishant. The air foaming extinguishant is classified into two, the protein-foaming extinguishant and the synthetic surface active agent-foaming extinguishant. These are used mainly for the oil fire called the fire B. Foaming is induced by mixing water containing 3-6% extinguishants with water, and the foams cover the surface of burning oil to extinguish the fire. Proteinous agents currently predominate, but it is known that they are accompanied by deterioration with time of the performance due to putrefaction or degeneration which is caused by natural hydrolyzed protein used as the starting material. They have also such disadvantages as offensive odor and poor fluidity. On the other hand, surface active agent-containing materials, which are free from the above-mentioned disadvantages, are inferior to the proteinous materials in extinguishing capacity which is critical one as well as in liquid resistance so that they are almost unusable for big oil fire such as tank fire. The compositions of the invention, in which a highly foaming surface active agent is used as the surface active component, can be subjected to foaming in the same form as with the protein and surface active agent extinguishants. Moreover, the aqueous gel from the compositions preserves its characteristic even when foamed; aqueous gelation of the foam takes place. Thus, the foam is stabilized so as to be resistant not only to flame but also to high temperature oil to a surprising degree. Use of the compositions of the invention as the foaming extinguishant is not accompanied by the disadvantages for the proteinous agents such as deterioration with time of the performance due to putrefaction or degeneration and offensive odor. There are obtained novel extinguishant far superior in fire-fighting performance to the surface active agent extinguishants. As the surface active agent used in the compositions of the invention for use as the foaming extinguishant is preferred a salt of lauryl sulfate, salts of mixed higher alcohol sulfate or the like. However, other readily foaming anionic and nonionic surface active agents may also be employed. As the compositions contain calcium ion as an essential component, sea water is effectively employed as the water source for the extinguishant. Fire fighting can be performed by preparing as the original extinguisher solution an aqueous solution comprising a foaming surface active agent and a maleic derivative copolymer salt and, as needed, containing EDTA or THPA, mixing the original solution through an appropriate proportioner with sea water and supplying foams produced from the mixture by a foaming nozzle over the surface of burning oil.

In addition, the aqueous gel compositions of the invention can be used as soil stabilizers, thickeners, adhesion modifiers, etc. In accordance with the object of use, various compounds such as an antioxidant, freezing-point depressant and antiseptic may be added within a range not interfering the results of the invention.

It is possible in order to facilitate handling of the compositions of the invention to prepare a mixture composed of three components other than water and dissolve the mixture in water on use to form a composition of the invention. This process is advantageous in storage and transportation.

DESCRIPTION OF PREFERRED EMBODIMENTS

The invention will be described in more details by the following examples:

EXAMPLES 1-5 AND COMPARATIVE EXAMPLES 1-3

A polymerization was carried out at 70° C. for 4 hours using 54.1 g. of butadiene, 98.1 g. of maleic anhydride and 1.7 g. of azobisisobutyronitrile in 750 cc. of acetone. There was obtained 106.0 g. of a pale yellow copolymer with an intrinsic viscosity of 0.50 as measured in cyclohexanone at 30° C. (All measurements are done hereinbelow under the same conditions.) A reaction was carried out at 80° C. for 1 hour using 15.2 g. of the copolymer, 6.0 g. of sodium hydroxide and 131 g. of water to form an aqueous solution of butadiene-maleic acid copolymer sodium salt. The aqueous solution, an aqueous calcium-chloride solution at a concentration of 0.1 M/l, 30% aqueous solution of sodium lauryl sulfate (LAS) and water were employed together with THPA in an amount equal to the copolymer salt to prepare compositions shown in Table 1. Whereas aqueous gel was formed with the compositions of Examples 1-5, no aqueous gel was formed or the polymer was precipitated with the compositions of Comparative Examples 1-3, in which one of the essential components was not contained.

TABLE 1

| Example or Comparative Example | Composition | | | | Formation of aqueous gel |
|---|---|---|---|---|---|
| | LAS | Copolymer salt | Ca$^{++}$ | Water | |
| Example 1 | 0.6 | 0.8 | 0.03 | 97.7 | ◯ |
| Example 2 | 0.6 | 0.8 | 0.1 | 97.5 | ◯ |
| Example 3 | 1.0 | 1.3 | 0.5 | 95.0 | ◯ |
| Example 4 | 3.4 | 2.0 | 0.7 | 90.7 | ◯ |
| Example 5 | 0.1 | 0.2 | 0.01 | 99.5 | ◎ |
| Comparative Example 1 | 0.6 | 0.8 | 0 | 97.8 | X |
| Comparative Example 2 | 0.6 | 0 | 0.5 | 98.0 | X |
| Comparative Example 3 | 0 | 0.8 | 0.5 | 97.0 | X* |

◯: Non-fluid aqueous gel formed.
◎: Fluid aqueous gel formed.
X: No aqueous gel formed.
*Precipitates formed.

EXAMPLE 6

An aqueous solution of a copolymer sodium salt was prepared using 15.2 g. of the butadiene-maleic anhydride copolymer used in Examples 1-5, 7.6 g. of sodium hydroxide and 129 g. of water. To the aqueous solution was slowly added with stirring 90 cc. of 1 M/l aqueous magnesium chloride solution. The mixture was heated on a boiling water both to separate solid. The solid was separated by filtration while hot, and then cooled to reproduce a viscous aqueous solution. Concentration of the butadiene-maleic acid copolymer magnesium complex salt in the aqueous solution thus obtained was 15%. A 20 g. aliquot of the aqueous solution was added to 20 cc. of 0.1 M/l aqueous calcium chloride solution, followed by stirring. There was formed a non-fluid aqueous gel.

EXAMPLE 7

To an aqueous solution prepared from 3 g. of polyoxyethylene nonylphenol ether, 0.5 g. of EDTA and 20 cc. of 0.1 M/l aqueous calcium chloride solution was added 20 g. of the aqueous solution of the butadiene-maleic acid copolymer magnesium complex salt prepared in Example 6, followed by stirring. Sufficient fluidity was maintained after 30 min. with a viscosity slightly increased. On allowing to stand for additional 1 hr. there was formed a non-fluid aqueous gel. The rate of gelation was much slower than in Example 6.

EXAMPLE 8

A polymerization was carried out at 70° C. for 6 hrs. using 54.1 g. of butadiene, 98.1 g. of maleic anhydride, 1.7 g. of azobisisobutyronitrile and 36.0 g. of n-dodecylmercaptan in 750 cc. of acetone. There was obtained 61.0 g. of a white copolymer with an intrinsic viscosity of 0.08. Proportion of the end dodecylthio group in the copolymer was found by the elementary analysis for sulfur to be 5.4%. A reaction was carried out at 80° C. for 1 hr. using 16.1 g. of the copolymer, 6.0 g. of sodium hydroxide and 139 g. of water to give an aqueous solution of a butadiene-maleic acid copolymer sodium salt containing end dodecylthio groups. A composition identical in composition with the composition of Example 2 was prepared using the above-prepared aqueous solution, an aqueous calcium chloride solution at a concentration of 0.1 M/l, an aqueous solution of sodium lauryl sulfate at a concentration of 30% and water to which THPA was added in the same amount as that of the copolymer salt. Aqueous gel obtained from the composition was slower in rate of the gelation and lower in strength of the gel as compared with the aqueous gel of Example 2.

EXAMPLE 9

A polymerization was carried out at 60° C. for 6 hrs. using 68 g. of isoprene, 98.1 g. of maleic anhydride and 1.7 g. of azobisisobutyronitrile in 500 cc. of acetone to yield 92 g. of a copolymer with an intrinsic viscosity of 1.21. Using 16.6 g. of the copolymer, 5.7 g. of 30% aqueous ammonia and 144 g. of water was prepared an aqueous solution of isoprene-maleic acid copolymer ammonium salt. A composition identical in composition with the composition of Example 2 was prepared using the above-prepared aqueous solution. Strength of the gel from the composition was found to be higher than the strength in any of Examples 2 and 8.

EXAMPLE 10

An aqueous gel was prepared in entirely the same way as in Example 9 except that the sodium salt of lauryl alcohol sulfate was substituted with triethanolamine salt of the same. The resulting aqueous gel exerted properties almost the same as in Example 9.

EXAMPLE 11

An aqueous gel was prepared in entirely the same way as in Example 9 except that the sodium lauryl sulfate was substituted with polyoxyethylene lauryl ether. The resulting aqueous gel also exerted the same properties as in Example 9.

EXAMPLE 12

An aqueous gel was prepared in entirely the same way as in Example 9 except that the sodium lauryl sulfate was substituted with sodium dodecylbenzenesulfonate. The resulting aqueous gel was identical with one in Example 9.

EXAMPLE 13

A polymerization was carried out at 70° C. for 2 hrs. using 68 g. of isoprene, 98.1 g. of maleic anhydride and 10.0 g. of lauryl peroxide in 750 cc. of acetone. There was obtained 99.7 g. of copolymer with an intrinsic viscosity of 0.6. To 200 cc. of methanol was added 20 g. of the copolymer, and the mixture was heated to a solution. Then, methanol was distilled off from the solution, and the residue was further subjected to drying in vacuum to remove the unreacted methanol. Yellow solid thus obtained was identified to be isoprenemonomethyl maleate copolymer by the IR spectrum. A reaction was then carried out at room temperature using with stirring 19.8 g. of the esterified copolymer, 4.0 g. of potassium hydroxide and 174 g. of water. There was prepared an aqueous solution of potassium salt of the isoprene-monomethyl maleate copolymer, 10 g. of which was then mixed with 2.0 g. of sodium polyoxyethylene glycol lauryl ether sulfate and 500 ml. of artificial sea water. The aqueous solution was gradually thickened, and after 1 hr., a non-fluid aqueous gel was formed.

EXAMPLE 14 AND COMPARATIVE EXAMPLE 4

A starting solution for foaming extinguishant was prepared using the aqueous solution of the end n-dodecylthio group containing butadiene-maleic acid copolymer sodium salt prepared in Example 8, sodium lauryl sulfate, THPA and EDTA. The components in the extinguishant starting solution were formulated to contain 10% of the copolymer sodium salt, 8% of sodium lauryl sulfate, 5% of THPA, 2% of EDTA and 75% of water (called Extinguishant A). A synthetic surface active agent-containing extinguishant commercially available from Firm S was used for comparison's sake (called Extinguishant B). A mixture of 6 ml. of Extinguishant A and 194 ml. of artificial sea water was blended and placed in a 2000-ml. home mixer, which was then operated for 2 min. for foaming. In Table 2 are shown the foamed magnification and residual foams after 3 hrs. as determined by the following equations:

$$\text{Expansion Rate} = \frac{\text{Volume of the foams immediately after formed (ml.)}}{\text{Quantity of the solution used (ml.)}}$$

$$\text{Residual foams} = \frac{\text{Volume of the foams after 3 hrs. (ml.)}}{\text{Volume of the foams immediately after formed (ml.)}} \times 100$$

The same experiment was repeated with Extinguishant B. Results of the experiments are shown in Table 2, which indicate that Extinguishant A formed very stable foams but from commercially available Extinguishant B were produced extremely unstable foams.

TABLE 2

| | Extinguishant | Expansion Ratio | Residual foams (%) | Liquid resistance |
|---|---|---|---|---|
| Example 14 | A | 6.5 | 90 | Good |
| Comparative Example 4 | B | 7.0 | 25 | Poor |

EXAMPLE 15

A cylindrical iron beaker 10 cm. in diameter and 10 cm. in height was filled with gasoline to a height of 5 cm. It was ignited and burned for 5 min. Subsequently, the fire was extinguished by pouring the foams produced in the same way as in Example 15 into the beaker to its top. The same experiment was repeated with foams for Extinguishant B. The burning gasoline could be extinguished with either of Extinguishants A and B. When Extinguishant A was employed, about 60% of the foams resided even 5 min. after the extinguishment and no ignition took place with flame again approached. On the contrary, the foams from Extinguishant B entirely disappeared on the oil surface 2 min. after the extinguishment and the oil was ignited immediately when flame was approached again, thus indicating poor resistance to high temperature oil.

We claim:

1. Aqueous gel compositions comprising as the essential components (a) from 0.1 to 10% by weight of one or more surface active agents selected from the group consisting of anionic and nonionic surface active agents, (b) from 0.1 to 10% by weight of a water soluble salt of a copolymer of a diene and maleic acid or a maleic acid derivative, (c) from 0.01 to 1% by weight of calcium ion and (d) water, the cation portion of said water soluble salt being a member selected from the group consisting of sodium, potassium, lithium, magnesium, ammonium and amine.

2. Aqueous gel compositions comprising as the essential components (a) from 0.1 to 10% by weight of one or more surface active agents selected from the group consisting of anionic and nonionic surface active agents, (b) from 0.1 to 10% by weight of a water soluble salt of a copolymer of a diene and maleic acid or a maleic acid derivative, (c) from 0.01 to 1% by weight of calcium ion, (d) from 0.1 to 10% by weight of a chelating agent and (e) water, the cation portion of said water soluble salt being a member selected from the group consisting of sodium, potassium, lithium, magnesium, ammonium and amine.

* * * * *